UNITED STATES PATENT OFFICE.

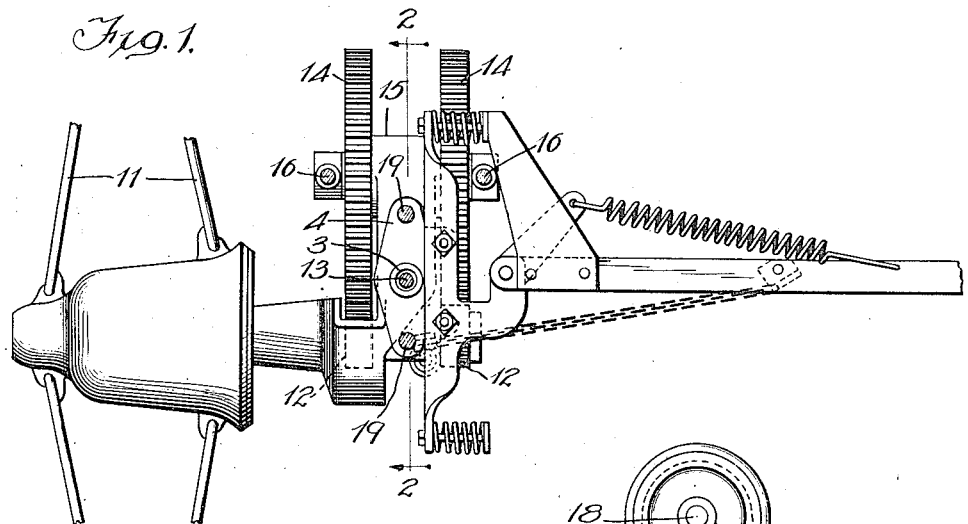
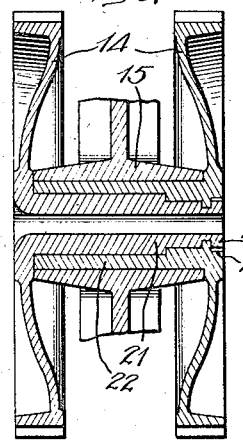
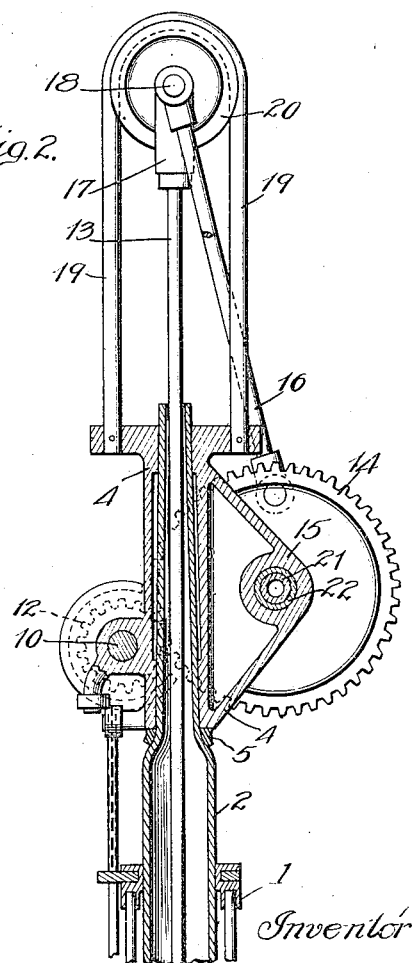

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

POWER-TRANSMISSION MECHANISM.

1,143,324.      Specification of Letters Patent.      Patented June 15, 1915.

Original application filed April 9, 1914, Serial No. 830,580. Divided and this application filed October 7, 1914. Serial No. 865,484.

*To all whom it may concern:*

Be it known that I, DANIEL R. SCHOLES, a citizen of the United States, residing at Chicago, in the county of Cook and State of Illinois, have invented a certain new and useful Improvement in Power-Transmission Mechanism, of which the following is a full, clear, concise, and exact description, reference being had to the accompanying drawings, forming a part of this specification, this application being a division of my original application Serial No. 830,580, filed April 9, 1914.

My invention relates to power transmission mechanism and has been embodied in a wind mill structure, though the invention is not to be limited to any particular use to which it may be put.

The application of the invention to a wind mill structure is disclosed in my original application Serial No. 830,580, filed April 9, 1914, of which original application the present application is a division.

One feature of my present invention may be generally described as comprising a pair of gears in mesh with another pair of gears driven by the first, the gears of the second pair having shafts that are in telescoping and relatively rotatable relation.

In accordance with another feature of my invention, which additional feature is preferably employed in a mechanism embracing the first feature of the invention, the gears of one pair have formations for maintaining the spacing therebetween and which formations are adapted for interengagement, upon relative rotation of the gears having the same, in order to maintain such spacing, the remaining gears operating to preserve the interengagement of said formations.

As I have practised the invention the first pair of gears are driven by the wind wheel of a wind mill while pitmen establish power transmitting connection between the gears of the second pair and the load or pump rod of the wind mill. By means of my invention there is an even division of the driving power between the two sets of meshed gears and the pitmen since the gears which are coupled with the pitmen are free to move relatively in their planes to compensate for inaccurate alinement of the gear teeth.

The accompanying drawing illustrates the adaptation of my invention to a wind mill structure, Figure 1 being a plan view of so much of the structure as is necessary to an understanding of the invention; Fig. 2 a sectional elevation on line 2 2 of Fig. 1; Fig. 3 an axial sectional view through the gearing of my invention; and Fig. 4 a side view of the gearing.

Like parts are indicated by similar characters of reference throughout the different figures.

The portion of the wind mill structure illustrated includes a tower 1 which terminates in an upright stationary tubular column 2 whose reduced upper end constitutes an upright shaft 3 that affords an upright axis about which the wind mill head 4 may turn upon a step bearing ring 5 supported upon the tubular column portion 2.

The shaft 10 of the prime mover, in this instance the wind wheel 11 of a wind mill, is journaled upon the mill head and carries a pair of upright pinions or gears 12 for driving the upright pump or load rod 13.

A pair of upright transmission gears 14 are in mesh with the pinions or gears 12 and are journaled within a bearing 15 carried by the head 4. Pitmen 16 connect the gears 14 with the upper end of the load rod 13.

A stirrup 17 is fixed upon the upper end of the load rod and carries a shaft 18. The stirrup 19 engages and guides the roller 20 on the shaft 18. The gears 12 are relatively fixed and, to insure the even division of driving power between the two sets of meshed gears and their pitmen, the gears 14 of the other pair are free to move relatively in their planes to compensate for inaccurate alinement of the teeth of either or both pairs of gears. The gears 14 are therefore provided with shafts 21 and 22 that are in telescoping and relatively rotatable relation, the outer sleeve shaft 22 being directly supported by the bearings 15 and itself constituting a bearing for the inner shaft 21 which may also be hollow if desired. The relative end play of the gears 14 is prevented by the preferred form of interengagement of the shafts 21 and 22 shown in Figs. 3 and 4. In the structure of these figures the gear shaft 21 carries an oblong end $21^1$ which may be positioned to slip through an oblong continuation $22^1$ of the bore of shaft 22 whereafter said shafts are relatively rotated to bring the flat end 21¹ in some such relationship as that illustrated in Fig. 4 and which relationship is substantially maintained by the intermeshing of the gears 14 with the gears 12.

While I have herein shown and particularly described the preferred embodiment of my invention I do not wish to be limited to the precise details of construction shown as changes may readily be made without departing from the spirit of my invention, but—

Having thus described my invention I claim as new and desire to secure by Letters Patent the following:—

1. Power transmission mechanism including a motor driven shaft; a reciprocating upright load rod; a pair of gears driven by the motor driven shaft; a second pair of gears which drive the load rod and which are driven by and are in mesh with the first; and pitmen that establish power transmitting connection between the gears of the second pair and the load rod, the gears of the second pair having shafts one of which enters the other and which shafts are in relatively rotatable relation.

2. Power transmission mechanism including a motor driven shaft; a reciprocating upright load rod; a pair of gears driven by the motor driven shaft; a second pair of gears driven by and in mesh with the first; and pitmen that establish power transmitting connection between the gears of the second pair and the load rod, the gears of the second pair having shafts one of which enters the other and which shafts are in relatively rotatable relation, the gears of the second pair having formations for maintaining the spacing between these gears and adapted for interengagement, upon relative rotation of these gears, then to maintain such spacing, the remaining gears serving by meshing with the others to maintain the space preserving interengagment of said formations.

3. Power transmission mechanism including a motor driven shaft; a reciprocating upright load rod; a pair of gears driven by the motor driven shaft; a second pair of gears driven by and in mesh with the first; and pitmen that establish power transmitting connection between the gears of the second pair and the load rod, the gears of the second pair having formations for maintaining the spacing between these gears and adapted for interengagement, upon relative rotation of these gears, then to maintain such spacing, the remaining gears serving by meshing with the others to maintain the space preserving interengagement of said formations.

4. Power transmission mechanism including a motor driven shaft; a pair of gears driven by the motor driven shaft; and a second pair of gears which drive the load and which are driven by and are in mesh with the first pair of gears, the gears of the second pair having shafts that are in telescoping and relatively rotatable relation.

5. Power transmission mechanism including a motor driven shaft; a pair of gears driven by the motor driven shaft; a second pair of gears which drive the load and which are driven by and are in mesh with the first pair of gears, the gears of the second pair having formations for maintaining spacing between these gears and adapted for interengagement, upon relative rotation of these gears, then to maintain such spacing, the remaining gears serving by meshing with the others to maintain the space preserving interengagement of said formations.

In witness whereof, I hereunto subscribe my name this 3rd day of September A. D., 1914.

DANIEL R. SCHOLES.

Witnesses:
MAX HOLMBURGER,
ROBT S. MCKEAGE.